Patented Sept. 18, 1945

2,384,969

UNITED STATES PATENT OFFICE 2,384,969

PREPARATION OF SYNTHETIC RUBBER-LIKE MATERIALS BY EMULSION POLYMERIZATION

George E. Serniuk, Roselle, N. J., assignor to Standard Oil Development Company, a corporation of Delaware No Drawing. Application June 13, 1942,
Serial No. 446,940

11 Claims. (Cl. 260—93)

The present invention pertains to the manufacture of synthetic rubber-like materials, and in particular to the preparation of such materials by emulsion polymerization.

It is an object of the present invention to provide the art with a novel method of polymerizing in aqueous emulsion butadienes or mixtures of butadienes or mixtures of butadienes with copolymerizable materials containing a single C=C group.

It is also an object of this invention to provide the art with a method of preparing emulsion polymerizates, which method is characterized by the production of high yields of a very desirable product.

It is a further object of this invention to prepare emulsion polymerizates of butadiene or emulsion copolymerizates of butadiene with copolymerizable materials that have good tensile strength and elongation as well as good plasticity.

It is also an object of this invention to provide the art with new emulsifiers for the preparation of synthetic rubber latices.

These and other objects will appear more clearly from the detailed description and the claims which follow.

It is well known that synthetic rubber-like materials are prepared by the polymerization of butadiene alone or by the interpolymerization of butadiene with copolymerizable materials, such as styrene, acrylic acid nitrile, methacrylic acid nitrile, methyl methacrylate, methyl vinyl ketone, and the like. Such polymerization has been effected in mass or in solution, using benzoyl peroxide, for example, as a catalyst, and also in aqueous emulsion using a compound capable of liberating oxygen, such as hydrogen peroxide, benzoyl peroxide and alkali metal persulfates as catalysts. It has been proposed to use as emulsifiers in the latter processes water soluble soaps, such as alkali metal or ammonium oleates and stearates as well as various synthetic surface active emulsifying agents such as salts of alkylated naphthalene sulfonic acids, fatty alcohol sulfates, and also certain acid addition salts of high molecular alkylamines. These materials have given rise to numerous problems and have been found objectionable for one reason or another. The soaps, as a general rule, must be used in relatively large quantities, and moreover are precipitated with the synthetic latices and therefore must be washed or extracted, at least in part, from the precipitated polymer in order to prevent their deleterious effect upon the working properties of the polymer. The synthetic emulsifiers which are characterized by their solubility in an acid as well as an alkaline medium are not completely precipitated along with the polymer and are not ordinarily used in such large amounts as the soaps, but they are most objectionable because they yield polymers of poor plasticity and unsatisfactory working properties.

I have found that emulsion polymerizates of excellent physical properties, that is, tensile strength, elongation and plasticity, are obtained when there is used as the emulsifying agent, the water soluble salts of sulphonic acid derivatives of certain high molecular olefines containing from about 12 to about 20 carbon atoms in the molecule. The polymerization is catalyzed as usual with compounds capable of yielding oxygen under the conditions obtained during polymerization, and I have found it preferable to provide a mercaptan modifier in the polymerization mixture.

My invention is applicable to the emulsion polymerization of butadienes generally, either singly or in mixtures, as well as in the copolymerization of butadienes with compounds containing a single C=C linkage and capable of forming copolymerizates with butadienes. Some butadienes which may be polymerized in accordance with the present invention include butadiene 1,3 and the homologues thereof, particularly isoprene and piperylene, as well as the 2-halogeno butadienes 1,3, particularly 2-chloro and 2-bromo butadiene 1,3. The copolymerizable materials containing a single C=C linkage include, for example, such compounds as styrene, acrylic acid nitrile, methacrylic acid nitrile, acrylic and methacrylic acid esters, fumaric acid esters, unsaturated ketones such as methyl vinyl ketone and 1,1 di-chloro-ethylene.

Catalysts which may be used include hydrogen peroxide, benzoyl peroxide, perborates and persulfates of ammonium or the alkali metals. The modifiers, which are preferably provided in the polymerization mixture, are mercaptans containing at least 7 carbon atoms in an aliphatic linkage such as octyl, decyl, dodecyl, octadecyl or benzyl mercaptan. The preferred modifier is a mixture of aliphatic mercaptans containing at least 50% dodecyl mercaptan, the remaining 50% being mercaptans containing 10–16 carbon atoms. Such a mixture of mercaptans can be prepared by blending pure individual mercaptans, or by preparing the mixture from a mixture of $C_{10}$ to $C_{16}$ alcohols containing at least 50% of $C_{12}$ alcohol, for example "Lorol" alcohol (Du Pont) which contains approximately 55% of $C_{12}$, 30% of $C_{14}$ and 15% of $C_{16}$ alcohols.

The emulsifiers used in accordance with the present invention are water soluble salts of sulfonic acids of certain high molecular weight olefines, or olefines containing about 12 to about 20 carbon atoms in the molecule. Olefines containing 12 to 20 carbon atoms in the molecule can be prepared in known manner, for example, by polymerizing such compounds as isobutylene, butene-2, 2,4,4-trimethyl pentene-1, trimethyl ethylene, pentene-2, 2,3,3-trimethyl-butene-1, hexene-3, or by cracking wax in either the vapor or liquid phase in the presence or absence of catalysts or by dechlorinating chloro wax. Isobutylene may be converted to a polymer by passing the vaporized olefin into naphtha containing a small amount of sulfuric acid of 98% concentration dispersed therein. The dimer can similarly be polymerized into higher polymers. Tetra-isobutylene is preferably prepared from diisobutylene by clay polymerization. Copolymers of suitable molecular weight such as those obtained by polymerizing normal and iso-olefins can also be employed as can the polymers of normal olefins such as those obtained from normal butylene by polymerizing with boron fluoride. Unsaturated polymers produced by the low temperature technique using a Friedel-Crafts type catalyst in the presence of alkyl halides can also find application here.

The resultant olefins are subjected to a careful sulfonation in order to form the corresponding olefin sulfonic acid. The sulfonation is preferably effected with a chlorosulfonic acid-ethyl ether complex or with sulfur trioxide addition compounds of dioxane and thioxane. In view of the mild sulfonating action of such complexes or addition compounds, the sulfonation is effected by substitution rather than by addition and the final products are characterized by containing a C=C double bond as well as a sulfonic acid group. Accordingly, the products obtained thereby may be termed true olefin sulfonic acids.

The emulsifiers are used in the form of water soluble salts, for example, the alkali metal, ammonium and organic base salts such as ethanolamine, morpholine, etc. I have also found that mixtures of such salts with each other or mixtures with the corresponding salts of divalent metals such as zinc, magnesium, iron, cobalt, and the like may be used to advantage.

The emulsifier is generally used in amounts of about 0.25 to 5%, preferably between 0.3 to 1.0%, based upon the amount of water in the polymerization mixture. Larger amounts of emulsifier may of course be used, although the amounts indicated suffice to give stable latices and good yields of a product of excellent properties. This is in contrast to soap type emulsifiers which require 2% or more to give stable latices.

The polymerization may be effected in either a neutral, a slightly alkaline, or a slightly acid medium. However, the pH preferred is 7.0 to about pH 9.0.

The following examples illustrate the present invention, but it is to be understood that my invention is not limited thereto:

Example 1

1 gm. of sodium bicarbonate and 6.5 gms. of sodium tetra-isobutenyl sulfonate are added to 400 gms. of water, 56.3 gms. of acrylic acid nitrile are added and the pH adjusted to 8.7. 25 cc. of water, 5 cc. of 27.8% hydrogen peroxide, and 160 gms. of butadiene 1,3 are added and the mixture agitated. The polymerization is continued in a closed reactor for about 17 hours at between about 25° C. and about 40° C. The polymerizate was precipitated by salting out, and the yield amounted to 76 gms. dry weight, corresponding to 35% conversion. The polymerizate had a tensile strength of 4,610 pounds per square inch and an elongation of 600%.

The following table summarizes a number of similar runs that were made using different amounts of emulsifier and different pH values:

| Per cent Na tetraisobutenyl sulfonate | Time, hours | pH | Per cent conv. | Tensile strength, #/sq. in. | Elong., per cent |
|---|---|---|---|---|---|
| 3.0 | 21 | 7.9 | 87 | 2,150 | 325 |
| 1.5 | 21 | 8.1 | 90 | 1,480 | 250 |
| 0.38 | 21 | 8.8 | 65 | 3,000 | 350 |
| 0.38 | 21 | 8.4 | 80 | 2,600 | 325 |
| 3.0 | 18.5 | 8.5 | 80 | 2,750 | 400 |

Example 2

1.65 gms. of sodium tetra-isobutenyl sulfonate were dissolved in 400 grams of water and 56 gms. of acrylic acid nitrile and 1 gm. of dodecyl mercaptan were added and the pH adjusted to 8.6. There was then added 0.8 gms. of potassium persulfate in 30 cc. of water and 160 gms. of butadiene 1,3. The mixture was agitated and polymerization was effected in a closed reactor at about 35° C. for 17 hours. A very slight precipitate was formed in the reaction vessel, the pH of the latex was 8.22, and the latex was precipitated coarse with brine. The dry weight of the polymer obtained was 172 gms., corresponding to an 80% conversion. The product had a tensile strength of 3,860 pounds per square inch and an elongation of 625%.

Example 3

2.15 gms. of sodium tetra-isobutenyl sulfonate and 2.15 gms. zinc tetraisobutenyl sulfonate were dissolved in 400 cc. of water and 57.5 gms. of acrylic acid nitrile and 1.0 gm. decyl mercaptan were added and the pH adjusted to 5.05; 0.68 gm. of ammonium persulfate dissolved in 25 cc. of water and 160 grams of butadiene were added. The mixture was agitated and the polymerization effected in a closed reactor at room temperature for 17 hours. The dry weight of polymer obtained after precipitating, washing and drying was 97.9 gms. corresponding to 45% conversion. The product was a solid plastic polymer.

Example 4

For the preparation of a Perbunan-type polymer a 46/54 ratio of acrylonitrile to butadiene was used. A fraction of the total butadiene was added portionwise. To maintain a relatively fast reaction rate and to control the uniformity of the product a fraction of the total mercaptan was also added portionwise. The following reactants in the amount shown were used. The reaction was carried out in a stainless steel clad turbomixer.

H₂O ------------------------------------cc-- 2000
Na-tetraisobutenyl sulfonate (¾% on water phase) ---------------------------gms-- 39
NaHCO₃ (0.15% on water phase)----gms-- 7.8
Acrylonitrile --------------------------gms-- 1192
Lorol mercaptan------------------------gms-- 13.0
(NH₄)₂S₂O₈ (0.125% on water phase) -------------------------------gms-- 6.5
H₂O aerated with CO₂----------------cc-- 3200
Butadiene 1,3-------------------------gms-- 1450
pH of emulsion adjusted to 8.0 by means of CO₂.

The pH of the mixture was maintained between 8.0–8.1 and the temperature held at 30–35° C.

A sufficient amount of latex was removed from the turbo at various conversions for evaluation. A summary of the data obtained are given in the following table:

| Sample No. | Reaction time | Reaction temp. | Conv. | Relative band time on cold 3' x 6' mill | Tensile strength | Ultimate elongation | Williams plasticity |
|---|---|---|---|---|---|---|---|
| | Hours | ° C. | Per cent | Minutes | Pounds | Per cent | |
| A | 6 | 35 | 64 | 1 | 4,140 | 580 | 180–167 |
| B | 7¾ | 35 | 76 | ¾ | 4,530 | 570 | 210–152 |
| C | 8 | 35 | -------- | ½ | 3,950 | 420 | 227–127 |
| D | 8½ | 35 | 80.6 | ½ | 4,160 | 410 | 231–145 |

Example 5

In the following experiment ¾ of a percent of Na-tetraisobutenyl sulfonate was used and the ratio of acrylonitrile to butadiene was 50/50. The following materials were charged into a stainless steel bomb.

| | | |
|---|---|---|
| Water | cc | 400 |
| Na-tetraisobutenyl sulfonate | gms | 3.22 |
| Sodium bicarbonate | gms | 1.0 |
| Acrylonitrile | gms | 110 |
| Lorol mercaptan (0.2% on water phase) | gms | 0.86 |
| $(NH_4)_2S_2O_8$ | gms | 0.65 |
| Water | cc | 30 |
| Butadiene 1,3 | gms | 115 | pH of emulsion adjusted to 8.4.

The bomb was shaken for 14 hours at 30° C. The following results were obtained:

| | | |
|---|---|---|
| pH latex | | 8.1 |
| Dry wt. of washed product | gms | 141 |
| Conversion on dry wt. basis | percent | 63 |
| Tensile strength | lbs./sq. in | 3970 |
| Elongation | percent | 600 |
| Williams plasticity | | 90–0 |

It is obvious from this and the previous example that it is possible to prepare both highly plastic and non-plastic rubbers by proper control of conditions when using this emulsifier.

Example 6

The following is a Perbunan run in which a 26/74 ratio of acrylonitrile/butadiene was used. The emulsifier was employed in a ¾% concentration. A stainless steel bomb was charged with the following:

| | | |
|---|---|---|
| Water | cc | 400 |
| Na-tetraisobutenyl sulfonate | gms | 3.22 |
| Sodium bicarbonate | gms | 1.08 |
| Acrylonitrile | gms | 56.3 |
| Lorol mercaptan | gms | 1.08 |
| $(NH_4)_2S_2O_8$ | gms | 0.65 |
| Water | cc | 30 |
| Butadiene | gms | 160 | pH of emulsion adjusted to 8.6 by means of $CO_2$.

The bomb was shaken at 35° C. for 17 hours. The following results were obtained:

| | | |
|---|---|---|
| pH of latex | | 7.4 |
| Dry wt. of product | gms | 189.5 |
| Conversion | percent | 88 |
| Tensile strength | lbs | 2190 |
| Elongation | percent | 420 |
| Williams plasticity | | 123–0 |

Example 7

A Buna S run was made using sodium tetraisobutenyl sulfonate as an emulsifier in a ¾% concentration based on the water phase. At the end of 16 hours at 45° C. a total of 95 gms. of butadiene 1,3 were recovered and the final latex had a pH of 8.9. The conversion to polymer was 35% based on the hydrocarbon reactants. The polymer was soft and possessed some tack.

The reactants were used in the following proportions:

| | | |
|---|---|---|
| $H_2O$ | cc | 400 |
| Sodium tetraisobutenyl sulfonate | gms | 3.22 |
| Sodium bicarbonate | gms | 1.0 |
| Styrene | gms | 56.3 |
| Lorol mercaptan | gms | 1.08 |
| $K_2S_2O_8$ | gms | 0.65 |
| $H_2O$ | cc | 30 |
| Butadiene 1,3 | gms | 160 | pH emulsion adjusted to 8.5 by means of $CO_2$.

What I claim and desire to secure by Letters Patent is:

1. The process of producing emulsion polymerizates of butadienes containing conjugated double bonds which comprises using water soluble salts of olefin sulfonic acids containing 12–20 carbon atoms in the molecule as the emulsifying agent in an aqueous medium.

2. The process of producing emulsion polymerizates of butadienes containing conjugated double bonds which comprises effecting the polymerization thereof in a from neutral to an alkaline aqueous medium, using water soluble salts of an olefine sulfonic acid containing 12–20 carbon atoms in the molecule as the emulsifying agent.

3. The process of producing emulsion polymerizates of butadienes containing conjugated double bonds which comprises effecting the polymerization thereof in a from neutral to an alkaline aqueous medium containing a mercaptan having an aliphatic radical of at least 7 carbon atoms attached thereto, and using water soluble salts of an olefine sulfonic acid containing 12–20 carbon atoms in the molecule as the emulsifying agent.

4. The process of producing emulsion polymerizates of a butadiene 1,3 hydrocarbon with a copolymerizable compound containing a single C=C group, which comprises effecting the polymerization of the mixtures of the butadiene hydrocarbon with said copolymerizable compounds in an aqueous alkaline medium, and using water soluble salts of an olefin sulfonic acid containing 12–20 carbon atoms in the molecule as the emulsifying agent.

5. The process of producing emulsion polymerizates of a butadiene 1,3 hydrocarbon with a copolymerizable compound containing a single C=C group, which comprises effecting the polymerization of mixtures of the butadiene hydrocarbon with said copolymerizable compounds in an aqueous alkaline medium containing a mercaptan having an aliphatic radical of at least 8 carbon atoms attached thereto, and using water soluble salts of an olefin sulfonic acid containing 12-20 carbon atoms in the molecule as the emulsifying agent.

6. The process of producing emulsion polymerizates of butadienes containing conjugated double bonds which comprises effecting the polymerization thereof in a from neutral to an alkaline aqueous medium, using water soluble salts of the reaction product of tetraisobutylene and a chlorosulfonic acid ethyl ether complex as the emulsifying agent.

7. The process as defined in claim 1, wherein the emulsifying agent is a water soluble salt of tetraisobutenyl sulfonic acid.

8. The process as defined in claim 2, wherein the emulsifying agent is a water soluble salt of tetraisobutenyl sulfonic acid.

9. The process as defined in claim 3, wherein the emulsifying agent is a water soluble salt of tetraisobutenyl sulfonic acid.

10. The process as defined in claim 4, wherein the emulsifying agent is a water soluble salt of tetraisobutenyl sulfonic acid.

11. The process as defined in claim 5, wherein the emulsifying agent is a water soluble salt of tetraisobutenyl sulfonic acid.

GEORGE E. SERNIUK.